United States Patent [19]

Puritz

[11] Patent Number: 4,525,918
[45] Date of Patent: Jul. 2, 1985

[54] TWO COMPONENT TOOL HOLDER, ESPECIALLY FOR A MACHINE TOOL OR ROBOT

[75] Inventor: Wolfgang Puritz, Buxtehude, Fed. Rep. of Germany

[73] Assignee: Messerschmitt-Boelkow-Blohm Gesellschaft mit beschraenkter Haftung, Munich, Fed. Rep. of Germany

[21] Appl. No.: 479,661

[22] Filed: Mar. 28, 1983

[30] Foreign Application Priority Data

Apr. 16, 1982 [DE] Fed. Rep. of Germany ....... 3214025

[51] Int. Cl.³ ............ B23Q 3/155; H01R 4/50
[52] U.S. Cl. .................. 29/568; 29/26 A; 279/89; 339/15; 901/50
[58] Field of Search ......... 409/233, 232; 29/27 C, 29/568, 26 A; 408/35, 239; 279/89, 90, 91; 339/15, 16 R, 16 CR, 16 C; 901/42, 50

[56] References Cited

U.S. PATENT DOCUMENTS

| 3,118,345 | 1/1964 | Bullard et al. ............ 409/233 |
| 3,595,109 | 7/1971 | Burroughs et al. ......... 408/35 X |
| 4,054,975 | 10/1977 | Lundstrom ............ 29/27 C |
| 4,281,447 | 8/1981 | Miller et al. ............ 29/568 |

FOREIGN PATENT DOCUMENTS

| 2029430 | 7/1972 | Fed. Rep. of Germany . |
| 2146592 | 9/1973 | Fed. Rep. of Germany . |
| 7033152 | 12/1974 | Fed. Rep. of Germany . |
| 2933063 | 3/1981 | Fed. Rep. of Germany . |
| 2951543 | 4/1981 | Fed. Rep. of Germany . |

Primary Examiner—Z. R. Bilinsky
Attorney, Agent, or Firm—W. G. Fasse; D. H. Kane, Jr.

[57] ABSTRACT

A tool, such as a drill bit, cutting tool or any other suitable tool, is held in a two component tool holder. The first component (1) includes a holder sleeve (3) with a conical bore (2). The sleeve (3) is held in a housing (19) carried by a machine tool, robot or the like. The second component (25) which carries the tool proper has a conical shaft (26) with a locking groove (29) near its free end. The conical shaft (26) locks into the conical bore (2) in the sleeve (3). An additional automatic locking is provided by at least two locking bolts (12) located to reach radially through the sleeve (3) into the locking groove (29) when the shaft (26) is inserted into the conical bore (2) of the sleeve (3). The locking bolts (12) are biased by springs (14) into the locking position and pulled out of the locking position by pneumatic or hydraulic pressure operated elements. Centering pins (4) and centering grooves (38) cooperate with each other to make sure that the conical shaft (26) is properly and automatically received in the conical bore (2). Both components carry pressure supply connector elements and electrical connector elements of the plug-in type.

9 Claims, 4 Drawing Figures

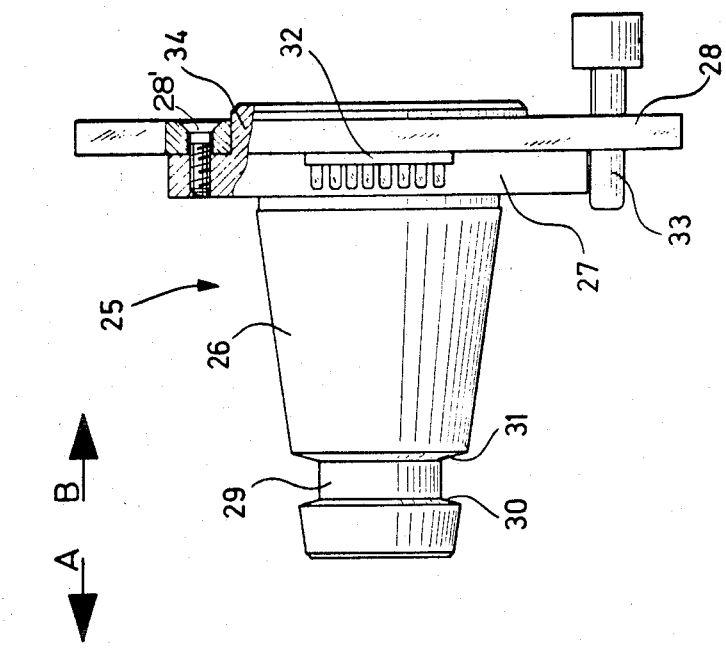
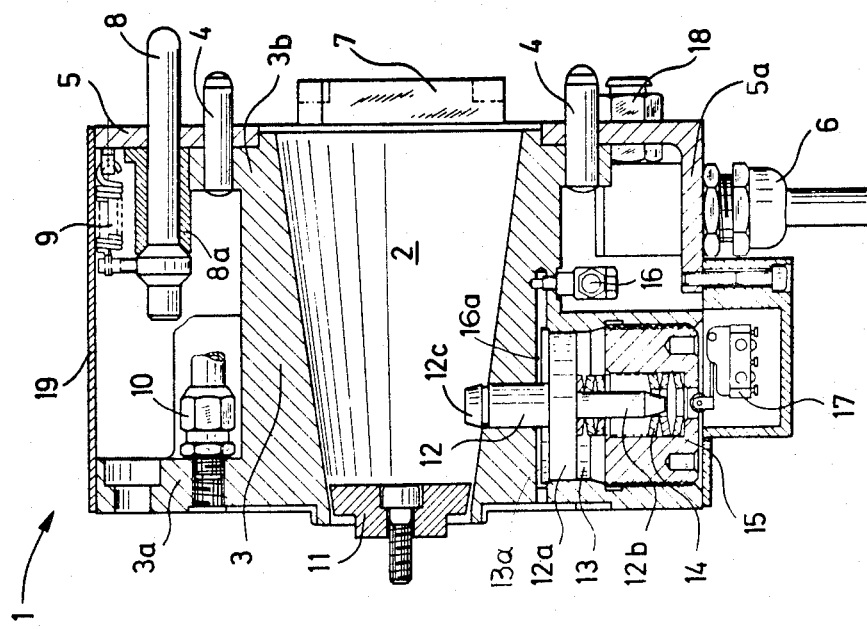

TWO COMPONENT TOOL HOLDER, ESPECIALLY FOR A MACHINE TOOL OR ROBOT

BACKGROUND OF THE INVENTION

The invention relates to a two component tool holder, especially for a machine tool or robot which carries one component of the holder while the other component carries the tool proper. Preferably, one component comprises a sleeve with a conical bore and the other component comprises a shaft with a conical shape fitting into the conical bore, whereby the relative position of the conical shaft in the conical bore is determined by locking and connecting elements.

Such a tool holder is known from German Patent Publication (DE-OS) 2,933,063. In the known device a male outer conical member of a tool is inserted into a female internal conical recess of a tool carrier body with the aid of a clamping device. Such a known structure is not suitable for an efficient automatic manufacturing operation due to the insertion and connecting, as well as locking exclusively with mechanical or rather manual means.

OBJECTS OF THE INVENTION

In view of the above it is the aim of the invention to achieve the following objects singly or in combination:

to construct a two component tool holder of the type described above which is suitable for use in automatically operating machine tools and robots;

to provide a tool holder which is sufficiently versatile so that a male conical shaft may be inserted manually or automatically into a respective female conical recess or bore; and to provide a tool holder which is universally suitable for carrying or holding all kinds of tools such as boring bits, grinding and polishing tools, riveting tools, cutting tools, spraying devices or the like.

SUMMARY OF THE INVENTION

According to the invention the present two component tool holder comprises at least two locking elements which are arranged for cooperation with a sleeve having a conical bore for receiving a conical shaft and for locking the shaft in the bore. For this purpose the two locking elements are operable hydraulically or pneumatically and extend perpendicularly to the central axis of the cooperating conical members. The means for automatically operating the locking elements are supported in the housing which also supports the sleeve with the conical bore. The locking elements are automatically movable into and out of the locking groove of the male conical shaft. Further connecting elements are arranged on the sleeve housing forming part of the first component and on the second component carrying the male conical shaft for properly centering the two components to each other.

The substantial advantage of the invention is seen in that a tool carried by the second tool holder component with the male conical shaft can be automatically locked and also unlocked in the machine tool or the like when the second component is inserted into the first component, for example, by an arm of a robot, whereby simultaneously all functional connections between the two components are established, such as hydraulic and electrical connections. It is also possible to secure the first component of the tool holder with the sleeve to an arm of a robot, whereby the invention may be used in such manufacturing robots. The robot arm is controlled conventionally for moving the first component with the sleeve having a conical bore relative to a tool holding magazine for retrieving tools out of the magazine and for returning tools into the magazine.

BRIEF FIGURE DESCRIPTION

In order that the invention may be clearly understood, it will now be described, by way of example, with reference to the accompanying drawings, wherein:

FIG. 1 is a sectional view through the first tool holder component with a sleeve having a conical bore therein;

FIG. 2 is a side view partially in section of the second component of the present tool holder with the male conical shaft;

Figure 4:
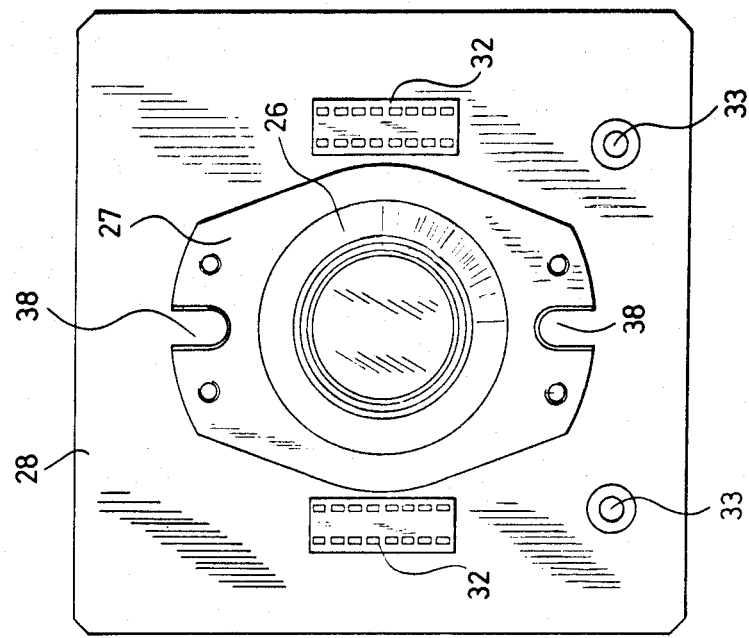
FIG. 4 is a view in the direction of the arrow B in FIG. 2 showing a view against the bottom surface of the second tool holder component.

DETAILED DESCRIPTION OF PREFERRED EXAMPLE EMBODIMENTS AND OF THE BEST MODE OF THE INVENTION

FIG. 1 shows an axial section through the first component 1 of the present tool holder having a sleeve 3 with a female conical bore 2 therein. The first component 1 is secured in a machine tool not shown, such as a milling machine or an arm of a robot or any other tool handling apparatus. The sleeve 3 is provided with a rear flange 3a and a front flange 3b. The front flange 3b faces toward the second tool holder component 25 according to the invention shown in FIG. 2 which carries a tool proper. The tool itself, such as a drill bit or any other suitable tool, is not shown in FIG. 2. The front flange 3b carries two centering pins 4 which perform two functions. First, they secure a cover plate 5 to the front flange 3b and secondly, these pins 4 help centering and defining the position of the second component 25 and thus of the tool relative to the first component 1. The covering plate 5 has an angled side portion 5a extending at a right angle to the cover plate 5. Electrical inlet connectors 6 are secured to the side portion 5a.

Figure 3:
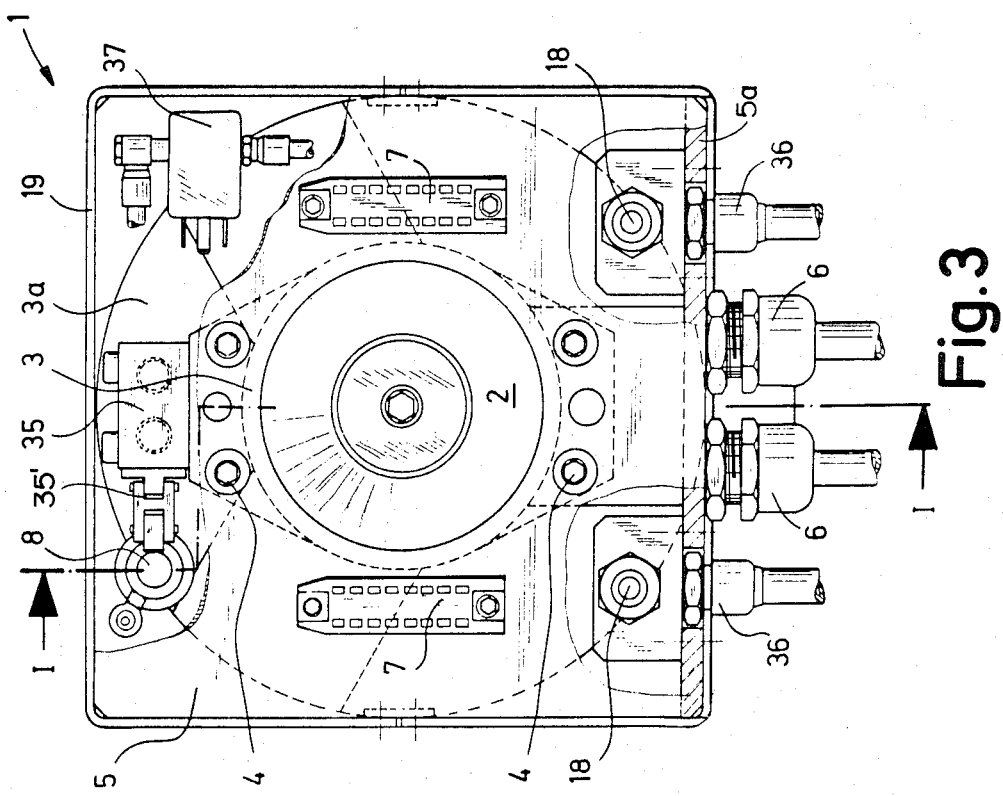
FIG. 3 is a view in the direction of the arrow A in FIG. 1 showing the top surface of the first tool holder component.

Electrical plug-in coupling members 7, also shown in FIG. 3 are arranged on both sides of the conical bore 2. These plug-in coupling members 7 may have a plurality of plug-in holes. A switch sensor 8 is arranged above the coupling members. The switch sensor 8 is guided in a guide bushing 8a and is held in the illustrated position by a biasing spring 9. A pressurized air inlet 10 is secured to the rear flange 3a for supplying pressurized air into a ring nozzle 11 for blowing out dust and any other contaminations from the conical bore 2. The pressure conduit from the inlet 10 to the nozzle 11 is not shown for simplicity's sake.

According to the invention at least two locking elements such as radially extending locking bolts 12 are arranged in the rear portion of the sleeve 3 with the conical bore 2. The locking bolts 12 extend at right angles to the longitudinal axis of the conical bore 2. Only one locking bolt 12 with its automatic locking mechanism is shown in FIG. 1. However, the other locking bolt and its locking mechanism is of the same construction and may be spaced at any desired circumferential angular position relative to the locking bolt 12 shown in FIG. 1. The locking bolt 12 is simultaneously a piston rod for a piston 12a and the piston 12a, the piston rod 12, and its guide pin 12b may be manufactured as a single integral component, for example, by a turning operation on a lathe. The piston 12a is axially displaceable within a cylinder space 13, whereby a seal is formed between the inner surface of the cylinder 13 and the piston 12a. The guide pin 12b serves simultaneously as a guiding member and as a carrier for a plurality of cup springs 14 arranged in a stack for normally biasing the locking bolt 12 into the locking position. The cup springs 14 are held in place between the piston 12a and a threaded ring member 15 in such a manner that these springs bias the piston to normally rest against the upper facing surface of the cylinder 13 formed by a portion of the sleeve 3. In this position the locking bolt 12 reaches into the conical bore 2 as mentioned. Rotation of the threaded ring 15 in one or the other direction serves for adjusting the biasing force of the springs 14. For this purpose the ring 15 is provided with holes for the insertion of a tool not shown for adjusting the biasing force. This structure advantageously results in a very short cylinder 13 and in a similarly short engagement and disengagement stroke of the locking bolt piston rod 12 as shown in FIG. 1.

A pressure inlet 16 is connected through a duct 16a which reaches into the cylinder space 13a of the cylinder space 13 in the sleeve 3 for automatically moving the piston 12a and with it the locking bolt 12 against the force of the springs 14. Thus, when a pressure medium is introduced into the inlet 16, the bolt 12 is withdrawn from the bore 2 thereby permitting the separation of the first and second tool holder components from each other. When the pressure supplied to the inlet 16 is switched off, the springs 14 again bias the locking bolt 12 to reach into the bore 2, whereby the bolt 12 is in its locking position as shown in FIG. 1.

The free end of the locking bolt 12 is provided with a conical surface 12c which reaches into a respective groove of the male conical shaft 26 as will be described in more detail below. The threaded ring 15 is so constructed with a through-hole at its lower end that the free end of the guide pin 12b may cooperate with a microswitch 17 in such a manner that the withdrawal of the locking pin 12 into the release or unlocking position results in the operation of the switch 17. This switch thus may provide an automatic signal which makes sure that an automatic take up or release of a tool takes place only when all locking bolts have reached the release position. For assuring a pressure supply for the tools to be held the respective pressure inlets 18 are arranged on the cover plate 5. The sleeve 3 with the conical bore 2 and the above described components are all held in a housing 19, for example, made of sheet metal.

FIG. 2 shows the second component 25 of the present tool holder comprising a conical male shaft 26 adapted to be received in the conical bore 2 of the first component 1. The right-hand end of the shaft 26 has secured thereto or integrally formed therewith a holding flange 27. A carrier plate 28 is secured to the flange 27 by means of screws 28'. The conical shaft 26 is provided near its free end with a locking groove 29 which has slanted side surfaces or flanks 30 and 31 forming first and second conical ring surfaces slanting respectively toward and away from a plane defined by said free end. The slant of the flank 30 corresponds to the slant of the conical end surface 12c of the locking bolt piston rod 12. Electrical plug-in connectors 32 and coupling nipples 33 are arranged on the carrier plate 28. These nipples 33 provide for a pressure supply to the tool not shown. The electrical connector 32 is adapted to be plugged into the coupling members 7 of the first component 1. The nipples 33 are connected to the pressure supply inlets 18 when the shaft 26 is received in the bore 2 of the sleeves 3. The flange 27 is provided with a centering projection 34 reaching through the carrier plate 28 and somewhat out of the carrier plate 28 for assuring an exact centering when a tool not shown is flanged to the carrier plate 28.

FIG. 3 shows a top plan view of the first component 1 shown in FIG. 1 in the direction of arrow A in FIG. 1, whereby the sectional view of FIG. 1 extends along section line I—I in FIG. 3. FIG. 3 especially illustrates the shape of the cover plate 5 and the arrangement of the electrical plug-in coupling member 7 as well as the pressure inlets 18 and the switch sensor 8. The cover plate 5 is shown partially broken away to show the rear flange 3a and above the sleeve 3 a pneumatic valve 35 for controlling the air blowing, which is used to keep the conical bore 2 free of contaminations. The pneumatic valve 35 is operated by a switch 35' through the switch sensor 8 located to the left of the valve 35. In addition to the above mentioned electrical inlet connectors or ducts 6 held in the bent portion 5a of the cover plate 5 there are arranged two pressure supply connectors 36 which are connected within the housing 19 of the component 1 with the two pressure connectors 18. FIG. 3 further shows the two centering pins 4 as well as a magnetic valve 37 for the actuation of the locking bolts 12. The valve 37 provides pressure or pressure relief to the duct 16a through the pressure inlet 16 for operating the piston 12a.

FIG. 4 shows the view in the direction of the arrow B in FIG. 2 with the free end of the conical shaft 26 facing the viewer and also showing the holding flange 27 and the carrier plate 28 with the two electrical plug connectors 32 and the coupling nipple 33. Centering grooves 38 are machined into the holding flange 27 for guiding the centering pins 4 when the shaft 26 moves into the bore 2.

In order to provide an efficient operation of the two component device according to the invention it is contemplated that each tool is equipped with the second component of the present tool holder so that each tool has its own conical shaft 26, whereby the shaft 26 may be inserted by hand or also automatically into the conical bore 2. Similarly, the removal may be accomplished manually or automatically. The present tool holder is especially suitable for use in connection with manufacturing robots.

By securing the first component 1, for example, to the arm of a robot it is possible to connect to the first component many different tools each having its own conical shaft 26. These tools have been mentioned above. In operation, the tool held in a magazine is picked up by the bore 2 of the first component 1 secured to the arm of a robot which moves the arm in accordance with a program control. During this movement the locking bolts 12 are in the withdrawn position due to fluid pressure in the cylinder space 13a, whereby the bolt ends or tips 12c do not reach into the bore 2. As the shaft 26 moves into the bore 2 the carrier plate 27 contacts the switch sensor 8, whereby the conical bore 2 is briefly blown through by air under pressure for cleaning the bore. Thereafter, the centering pins 4 enter into the centering grooves 38 of the holding flange 27, whereby the electrical couplings 7 and plug-in connector 32 are moved into cooperation with each other. Simultaneously, the pressure connecting inlets 18 are connected with the pressure nipples 33 in an axial alignment.

Thereafter, the locking bolts 12 are brought into the locking position shown in FIG. 1 by a respective control of the magnetic valve 37. The conical surfaces 12c at the tips of the locking bolts 12 and the slanted flank 30 are so arranged that these surfaces 12c contact only the flank 30. This feature makes sure that the conical shaft 26 is held in the conical bore 2 of the sleeve 3 in a form-locked manner by the force of the cup springs 14, whereby a force transmitting conical connection is formed. This conical connection remains effective even if the pressure supply should fail as the springs 14 remain effective.

Due to the pressure operable means provided according to the invention it is possible, as long as the supplied pressure is available, to provide the tools to be held by the present tool holder with pneumatically or hydraulically operable drives. The number of the required plug-in connections will depend on the requirements of any particular situation. The pressure connectors 18 and the coupling nipples 33 are of the so-called rapid coupling type known as such in the art. These rapid coupling connectors close themselves automatically when the connection is interrupted so that no pressurized air or hydraulic fluid escapes. The electrical connector 32 with the respective plug-in coupling members 7 provides the further possibility to connect electrical conductors or control cables to the tools.

When a tool is picked up or returned into a magazine, it is necessary to overcome a certain separation force between the conical shaft 26 and the bore 2 in the sleeve 3 and to also overcome the frictional forces resulting from the couplings and plug-in connections. In the above described example embodiment these forces are overcome in that the robot inserts the tool into the magazine where it is rigidly held or supported whereupon the robot pulls off the sleeve 3 from the shaft 26. It is further possible to facilitate or accomplish the release between the conical shaft 26 and the conical bore 2 by introducing air under pressure through the ring nozzle 11.

Although the invention has been described with reference to specific example embodiments it will be appreciated that it is intended to cover all modifications and equivalents within the scope of the appended claims.

What is claimed is:

1. A two component tool holder for a robot, said tool holder having a central longitudinal axis, comprising a first component (1) including a sleeve (3) with a conical bore (2) in the sleeve, and a second component (25) with flange means (27, 28) for holding a tool and with a conical shaft (26) fitting into said conical bore (2), said conical shaft having substantially adjacent its free end a circumferential shallow locking groove (29) having a first conical ring surface (30) slanting toward a plane defined by said free end, a second conical ring surface (31) slanting away from said plane defined by said free end, and a cylindrical groove bottom forming together with said first and second slanting ring surfaces said shallow locking groove (29), said holder further comprising shaft locking means including at least two locking bolts (12) arranged for moving perpendicularly to said central longitudinal axis through said sleeve (3) into said locking groove (29) when the conical shaft is in said conical bore, each of said locking bolts (12) having a conical tip (12c) with a slant for contacting only said first conical ring surface (30), whereby a movement of said conical tip (12c) along said ring surface (30) causes a form locking of the locking bolts (12) with the conical shaft (26) for pressing the latter firmly into said conical bore (2), said locking means comprising for each locking bolt (12) a piston (12a) including a piston rod directly forming said locking bolt (12) and cylinder means constructed in said sleeve (3) so that said tip (12c) of said piston rod forming said locking bolt extends through said sleeve (3) for automatically engaging and disengaging said first conical ring surface (30) of said shallow locking groove (29) in said conical shaft, said locking means further comprising spring means (14) arranged to cooperate with said piston (12a) opposite said piston rod (12) forming said locking bolt for normally pushing said locking bolt into contact with said first conical ring surface, except when a pressure medium is applied to said piston in said cylinder means opposite said spring means, whereby the engagement of said first conical ring surface by said locking bolt is effective even when a supply of said pressure medium fails, said tool holder further comprising corresponding connector means (18, 33; 7, 32) including at least one connector element located on each of the first and second tool holder components, said connector elements cooperating with each other for automatically providing a power and control supply for a tool held by said tool holder when the first and second tool holder components are brought into cooperation with each other.

2. The tool holder of claim 1, wherein said locking bolt piston rod extend substantially radially and perpendicularly to said central axis.

3. The tool holder of claim 1, wherein said cylinder means are arranged directly in said sleeve to form a pressure chamber in said sleeve for applying said pressure medium to said piston opposite said spring means for withdrawing the locking bolt piston rod from its locking position.

4. The tool holder of claim 1, wherein said spring means are cup springs arranged in said cylinder means for biasing said piston means.

5. The tool holder of claim 1, further comprising nozzle means (11) arranged in said sleeve (3) for closing said conical bore (2) at its narrow end, and means (10) for supplying air under pressure to said nozzle means for cleaning said conical bore with pressurized air.

6. The tool holder of claim 5, further comprising sensor means (8) and switch means (35') arranged for cooperation with said sensor means when the latter moves in response to bringing the first and second tool holder components together for actuating said switch means (35'), and magnetic valve means responsive to said switch means and operatively connected to said nozzle means (11) for controlling the supplying of pressurized air to said nozzle.

7. The tool holder of claim 1, wherein said first component (1) further comprises a cover plate (5) connected to said sleeve (3) adjacent the wide end of said conical bore, and centering pin means (4) operatively arranged on said cover plate (5) of said first component (1), said flange means of said second component (25) comprising centering grooves (38) arranged for cooperation with said centering pin means (4) when said first and second components are brought together.

8. The tool holder of claim 1, wherein said connector elements comprise at least one electrical plug-in connector element on each of the first and second components, said electrical plug-in connector elements engaging each other automatically when said first and second components are brought together.

9. The tool holder of claim 1, wherein said connector elements comprise at least one pressure medium supply connector element on each of the first and second components, said pressure medium supply connector elements engaging each other automatically when said first and second components are brought together.

* * * * *